Aug. 8, 1967    H. R. BILLETER ETAL    3,334,646

VACUUM BREAKERS

Filed March 15, 1965

INVENTORS
HENRY R. BILLETER
AXEL B. NELSON

PARKER & CARTER

ATTORNEYS

United States Patent Office 3,334,646
Patented Aug. 8, 1967

---

3,334,646
VACUUM BREAKERS
Henry R. Billeter, Deerfield, and Axel B. Nelson, Mount Prospect, Ill., assignors to Sloan Valve Company, Chicago, Ill., a corporation of Illinois
Filed Mar. 15, 1965, Ser. No. 439,552
6 Claims. (Cl. 137—218)

ABSTRACT OF THE DISCLOSURE

A vacuum breaker having a depending rubber sleeve in a flush tube together with an insert provided with water ports against which the sleeve collapses to prevent back-siphonage. The bottom of the sleeve is closed by three divergent spaced ribs each having a slit opened by water flow to conform to the wall of the flush tube, while the side walls of the sleeve close upon the air vents in the flush tube. The outer edge of each rib contacts the tube walls to normally space the sleeve from the tube to admit air below the sleeve.

---

This invention relates in general to a vacuum breaker but more particularly to vacuum breakers for plumbing systems and the principal object of the invention is to design a new and improved vacuum breaker for the aforesaid purpose.

Vacuum breakers are adaptable for use in water supply systems where there is danger of back-syphonage occurring from contaminated plumbing fixtures such as water closets, and it is an object of the invention therefore to provide an improved vacuum breaker which will safely and reliably prevent back-syphonage under all service conditions, and which will not leak when water flows through the device.

Another object is to provide an improved vacuum breaker device having a flexible sleeve valve member which will automatically act as a back-check to prevent reverse flow in a water supply line upon the occurrence of a vacuum condition, while admitting entry of air to the interior of the device to break the syphon, and which will effectively seal off the air inlets to prevent outward leakage responsive to water flow through the device.

Another object is to provide a vacuum breaker having a hollow flexible valve member closed on the outlet side by a series of three slits, which are arranged so that upon water flow through the device the slits are opened and deformed to a total annular length substantially equal in length to the perimeter of the outlet side of the device.

Further objects consist in the provision of a new and improved vacuum breaker which is relatively inconspicuous and attractive in its outward appearance, is simple and compact in construction and operation, is economical to manufacture and easy to install, and is highly efficient and durable in use.

With the foregoing and other objects in view, the invention consists in certain novel features of construction, operation, and combination of parts and elements, as will be more fully pointed out hereinafter in the description and claims, reference being had to the accompanying drawings which disclose a preferred embodiment of the invention in which;

The vacuum breaker of the invention generally includes a tubular outlet or casing, the lower end of which, in the usual plumbing installation, is connected to a water closet or other fixture, and the upper end connected to a flush valve for controlling the amount of water passing into the plumbing fixture. The vacuum breaker unit is interposed between the water closet bowl and flush valve for the purpose of preventing back-syphonage of contaminated water, from a possible clogged water closet bowl, into the potable water supply line connected to the flush valve. This could occur whenever a sub-atmosphere or vacuum condition exists in the water supply line brought on by reasons well known. The vacuum breaker is usually mounted at a specified distance above the spill line of the water closet bowl and directly below the outlet end of the flush valve.

Figure 1:
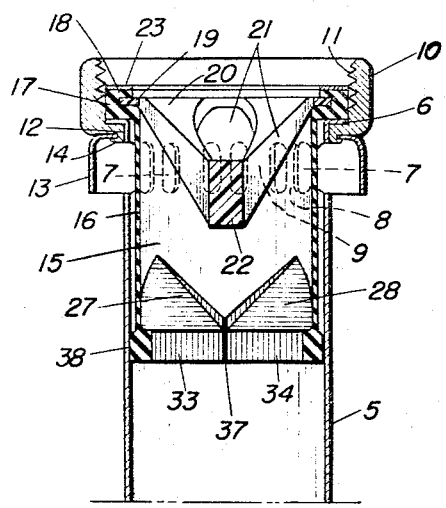
FIGURE 1 is a cross-sectional side view of the novel vacuum breaker with the parts shown in normal position, taken along the line 1—1 of FIGURE 2.

Referring to the drawings FIGURE 1, the outlet tube 5 is provided at its upper end with an annular supporting flange 6 formed therein together with a series of air ports or vents 7 arranged around the tube immediately below the flange 6. These air vents 7 are spaced apart in pairs with a relatively narrow portion 8 separating the vents of each pair and a wider portion 9 separating the pairs of vents. A coupling nut 10 is provided for securely attaching the unit, as by the internal screw threads 11, to the outlet end of a flush valve, for example. The coupling nut 10 has an inner annular flange 12 formed in it upon which the outlet tube flange 6 rests to support the outlet tube and other elements of the device. An annular skirt or hood 13 is provided as a shield for the air ports 7 to prevent the insertion of foreign objects tending to clog the air ports 7 and interfere with their normal function. The skirt 13 is spaced from the air ports 7 so that the air ports are fully effective to break any vacuum condition by admitting full atmospheric pressure into the interior of the device. The skirt 13 is supported at its upper end by being crimped at 14 to the bottom end of the coupling nut 10 as shown.

Figure 7:
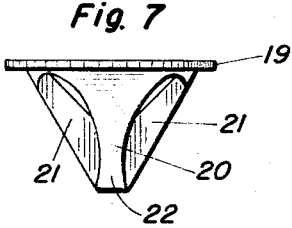
FIGURE 7 is a full side view of the insert member.

Arranged within the outlet tube 5, and in nested relationship therewith, is a flexible sleeve valve member 15 molded preferably of a synthetic rubber product such as "Neoprene" or "Hycar" which have certain well known superior qualities over natural rubber when utilized for the present purpose. Flexible sleeve valve 15 has relatively thin cylindrical side walls 16 vertically disposed and spaced slightly apart from the internal walls of the outlet tube 5. At its upper end the sleeve valve 15 has an annular flexible supporting flange 17 formed in it which rests upon the outlet tube flange 6. This supporting flange 17 also has an annular recess 18 formed in it to receive a rigid annular flange 19 for supporting the baffle or insert member 20 which extends across the outlet tube 5. The insert 20 is provided with a series of water ports 21, preferably three in number, for the passage of water into the device. These water ports 21 are large enough so that the insert 20 does not seriously impede the free flow of water therethrough. The insert 20 is tapered downward into an inverted cone shape with the bottom end 22 forming the apex as shown more clearly in FIGURE 7. The insert 20 is preferably molded of some suitable rigid plastic material such as "Nylon." A slip ring 23 may be placed on top of the flange 17 and when the coupling nut 10 is drawn up tight onto the flush valve (not shown) the whole vacuum breaker unit is securely fastened in place. The flange 17 also serves as a seal to prevent leakage outward through the threads 11 and around the flanges 19 and 6, and through the air vents 7.

Figure 2:
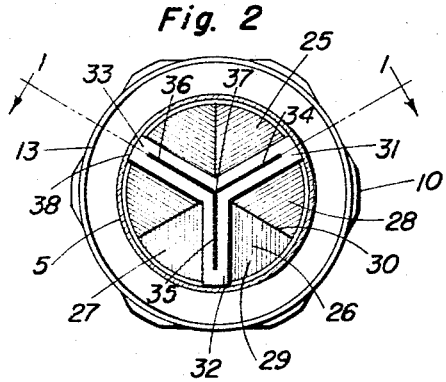
FIGURE 2 is a bottom view of the device.
Figure 6:
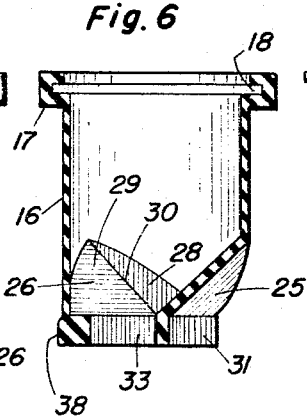
FIGURE 6 is a cross-sectional view of the flexible sleeve taken along the line 6—6 of FIGURE 5.

Adjacent the lower portion of the flexible sleeve valve member 15, the annular thin side walls 16 merge with a series of inwardly tapered wall sections 25, 26, and 27, three in number, which are slightly thicker than the cylindrical walls 16, as more clearly seen in FIGURE 6. Each tapered section 25, 26, and 27 also consist of flat triangular shaped portions 28 and 29 tapered and joined together at a line or crease 30 between the flat portions, the bottom end of which line 30 extends downward and inward towards the axial center 37 of the device. The extreme lower end of each flat portion 28 and 29 merges with a transversely arranged rib or lip portion 31 and 32. The other tapered sections 25 and 27 merge with the third rib portion 33 and also with ribs 31 and 32. The ribs or lip portions 31, 32, and 33 have slits 34, 35, and 36 respectively, cut in them extending from the axial point 37 of the unit outward to a point adjacent the outer end of the ribs as seen in FIGURE 2. Each of the slits 34, 35, and 36 terminates short of the outer end of associated rib or lip as shown, but each rib itself, for example rib 33, has a projecting end 38 which is in constant engagement with the inner side wall of the outlet tube 5 so that all portions of the flexible sleeve member walls 16, except for the ends 38, are spaced apart from outlet tube 5. One purpose of this arrangement is to insure that atmospheric pressure from the air vents 7 is always present below the bottom end of the device in the normal position.

One of the principal advantages of providing the flexible sleeve member 15 with only three slits 34, 35, and 36 is so that the sides of these slits will more nearly conform to the inner circumference or perimeter of the outlet tube 5 when water flows through the device, without creating any appreciable back pressure to impede the free flow of water. This result is accomplished by cutting each of the slits of such a length from the axial center 37 outward so each is equal approximately to one-sixth (⅙) the circumference of the inner perimeter wall of the outlet tube 5. As clearly seen in FIGURE 4, the outside walls of the ribs, when the slits are fully opened, closely hug the inner wall of the outlet tube 5 except for the small end portion 38 of each rib which is always in engagement with the outlet tube, and that portion of each rib where the inner sides of the rib are bent at the outer end of the slit. As an example, in a practical embodiment of the device, the three slits 32, 33 and 34 are arranged exactly 120 degrees apart and each slit is approximately $9/16$ inch (.5625) long, while the inner diameter or perimeter of the outlet tube is 1.25 inches. Therefore since the total annular length of the sides of the slits when fully opened is 3.365 inches and the inner circumference of the outlet tube is 3.927 inches ($ID \times TP$), it will be evident that better than 90% opening is produced through the device to provide full unimpeded flow of the water.

This decided improvement and advantage is only made possible by the employment of a flexible sleeve valve member, arranged with three slip outlets spaced 120 degrees apart, in contrast to flexible sleeve valve members formerly employed having a single transverse slit or those having four or more slits, or other variations. None of these variations can mathematically produce the unique conception of 120 degree spaced slits which, upon being stretched open, hug and conform to the inner perimeter of an outlet tube, and with minimum restriction to water flow.

Figure 3:
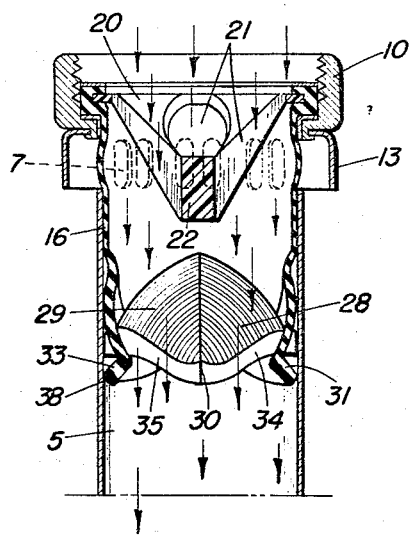
FIGURE 3 is a cross-sectional view taken along the line 3—3 of FIGURE 4, showing the position of the parts when water flows through the device.

In the operation of the vacuum breaker when installed, for example, in association with a flush valve and water closet, the manual tripping of the flush valve handle results in water flow through the vacuum breaker as indicated by the directional arrows in FIGURE 3. The water passes into the inlet end of the insert 20 and straight downward through the three water ports 21 into the flexible sleeve valve member 15. Since the slits in the flexible valve member are normally closed, the initial flow of water is subjected to slight back pressure tending to build up the volume of water within the upper portion of the sleeve so that the relatively thin side walls 16 are forced or expanded tightly against the air ports 7 thereby preventing outward leakage therefrom. The relatively thicker tapered wall sections such as 28 and 29 and the ribs 31, 32 and 33 also provide this necessary back pressure. The slight delay before the slits 34, 35, and 36 are fully opened is assisted by the ends 38 of each rib being normally in contact with the outlet tube walls thereby tending to hold the slits closed.

Figure 4:
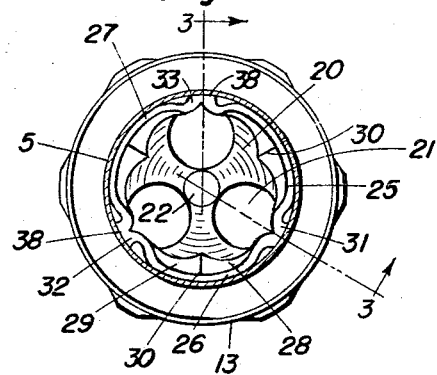
FIGURE 4 is a bottom view of the vacuum breaker with the parts in the position when water flow occurs.
Figure 5:
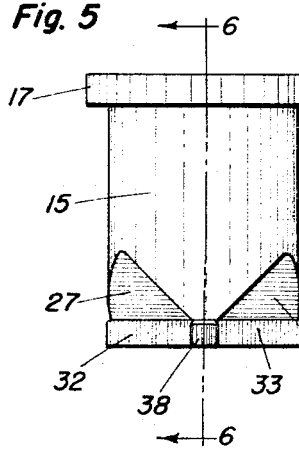
FIGURE 5 is a full side view of the flexible sleeve.

When full flow and pressures have been achieved through the flexible sleeve member and each of the tapered wall sections such as 28 and 29 have been expanded they assume the position depicted in FIGURE 4; the bottom edge of each of the ribs 31, 32 and 33 will closely conform to the inner perimeter of the outlet tube 5 as shown. In this position full flow takes place through the device without appreciable back pressures being present, a highly desired result. The cylindrical side wall 16 of the flexible sleeve member 15 is made sufficiently thin and elastic so that fairly low water pressures will be effective to expand the side wall and seal off the air ports 7, and, because of the manner in which the relatively narrow elongated air ports 7 are arranged in pairs, the side wall of the flexible sleeve is prevented from bursting through on relatively high pressures when such are encountered.

In the event that considerable back pressures are built up in the outlet tube 5 below the flexible valve member 15, either due to restrictions imposed by the type of water closet bowl connected thereto, or stoppage of the same, the walls of the flexible valve member are caused to bulge outward by pressure applied below the three ribs, causing the air ports 7 to be sealed off and preventing spurting and leakage therethrough.

Assume now that a vacuum condition occurs within the inlet water supply line, due possibly to a sudden withdrawal of the water in the plumbing system caused by any one of a number of conditions well known in the plumbing trade. Operation of the flush valve under such circumstances will usually result in the contaminated contents of a clogged water closet being sucked back into the pure water supply line. The vacuum breaker of the present invention prevents this undesirable action and in response to such a vacuum condition the thin side walls 16 of the flexible sleeve valve member 15 are immediately bulged inward by atmospheric pressure passing through the air vents 7, in tight seating engagement with the water ports 21. This action effectively seals off the back flow of contaminated water in the manner of a backcheck and prevents reverse flow. At the same time that the flexible side walls 16 are forced inward, the space between the side walls 16 and the outlet tube 5 is greatly enlarged, thereby affording a wide opening for entry of atmospheric pressure through the air vents 7 to the space below the bottom end of the vacuum breaker to break the vacuum therein and thereby prevent any rise in the water level in the outlet tube 5. In addition to the flexible sleeve valve member seating upon the water ports 21, the ribs 31, 32 and 33 close more tightly against the slits 34, 35 and 36 thereby acting as a back check and sealing off the bottom of the device. In most instances where a low or ordinary degree of vacuum is encountered, this bottom back check is sufficient to prevent back syphonage since the ribs are thick enough so they will not collapse.

An added feature of the invention resides in the relative quiet operation of the vacuum breaker. Former types of vacuum breakers invariably created a sucking or aspirating noise as the flush valve was shutting off. This was caused by the dropping column of water creating a slight vacuum behind it which enabled atmospheric pressure to rush into the air vents resulting in the annoying noisy action. In the present vacuum breaker this noise is entirely obviated because a certain amount of water is always present inside the device which tends to bulge out the sides of the sleeve into the air vents until all water flow has ceased, whereupon the air vents are opened. The residual water in the device also has a damping effect upon the water flow at the close off so that it takes place gradually, reducing the tendency to be noisy.

From the foregoing action, it will be seen that the flexible sleeve cannot reverse itself upwardly upon the occurrence of a high vacuum condition due to the presence of the rigid insert member 20. Should it occur that foreign objects lodge in the flexible sleeve and hang downward through the slits 34, 35 and 36, the lips would wrap themselves around the object and prevent back-syphonage. In the event that a defect occurs in the flexible sleeve attention will be quickly drawn to the same by leakage taking place through the air vents 7 so that the vacuum breaker is self-policing and replacement can be quickly accomplished. It will be apparent that a novel vacuum breaker has been designed in the present invention which acts as a combination back-check to prevent back-syphonage, and at the same time admits atmospheric pressure below the device to break the vacuum.

The invention herein disclosed is to be regarded as only illustrative and not restrictive to the particular embodiment, and the appended claims are therefor to be construed broadly, except for such limitations as may be necessary in view of the prior art.

What is claimed is:

1. In a vacuum breaker for a water supply system, a tubular casing having air ports around the sides thereof, a baffle member in said tubular casing having water ports therein, a flexible sleeve valve member in said tubular casing arranged between said tubular casing and said baffle member, means for clamping said baffle member and said flexible sleeve valve member together to the inlet end of said tubular casing, said flexible sleeve valve member operative responsive to water flow through said water ports to prevent leakage through said air ports, and operative responsive to a vacuum condition to prevent back syphonage through said water ports, said flexible sleeve valve member having a normally closed outlet end with side portions tapered inward and being provided with a plurality of spaced slits in the closed outlet end, the slits being formed in thickened end lip portions arranged between the tapered portions and extending transversely of said outlet end, the outer edges of said end lip portions extending outward from the outer wall of said sleeve member and being in contact with the inner wall of said tubular casing, whereby the outer side wall of said flexible sleeve valve member is spaced from the inner wall of said tubular casing to provide for entry of air from said air ports and below said sleeve valve member, said outer edges also serving to stiffen said lip portions to slightly delay opening of said slits upon water flow to insure that the side walls of said sleeve valve member close initially upon said air ports and prevent leakage therethrough.

2. In a vacuum breaker for a water supply system, a tubular casing having air ports around the sides thereof, a baffle member in said tubular casing having water ports therein, a flexible sleeve valve member in said tubular casing arranged between said tubular casing and said baffle member, means for clamping said baffle member and said flexible sleeve valve member together to the inlet end of said tubular casing, said flexible sleeve valve member operative responsive to water flow through said water ports to prevent leakage through said air ports, and operative responsive to a vacuum condition to prevent back syphonage through said water ports, said flexible sleeve valve member having a normally closed outlet end provided with alternate spaced, inward, and downwardly tapered wall sections, the outlet end having thickened lip portions transversely formed therein extending from engagement with the side wall of said tubular casing and converging toward the tubular casing axis, said thickened lip portions being arranged between said tapered wall sections and each having a normally closed slit formed therein extending transversely of said closed end, said lip portions each having an outer edge extending outward from the outer wall of said sleeve valve member and into contact with the inner wall of said tubular casing to provide a space therebetween for entry of air from said air ports and below said sleeve valve member, said outer edges also serving to stiffen said lip portions to slightly delay opening of said slits upon water flow and insure that the side walls of said sleeve valve member close initially upon said air ports and prevent leakage therethrough.

3. In a vacuum breaker for a water supply system, a tubular casing having air ports around the sides thereof, a baffle member in said tubular casing having water ports therein, a flexible sleeve valve member in said tubular casing arranged between said tubular casing and said baffle member, means for clamping said baffle member and said flexible sleeve valve member together to the inlet end of said tubular casing, said flexible sleeve valve member operative responsive to water flow through said water ports to prevent leakage through said air ports, and operative responsive to a vacuum condition to prevent back syphonage through said water ports, said flexible sleeve valve member having a normally closed outlet end provided with three alternate spaced and inwardly tapered wall sections, the lower end of said wall sections terminating in three relatively thickened end lip portions arranged between said tapered wall sections and merging therewith, said end lip portions also arranged transversely of said flexible sleeve valve member and extending from the wall of said tubular casing to the axis of said valve member where the end lip portions are merged, said end lip portions each having a normally closed slit formed therein extending from the axis of said valve member outward to a point adjacent the outer end of said end portion, said lip portions each having an outer edge extending outward from the outer wall of said sleeve valve member and into contact with the inner wall of said tubular casing to provide a space therebetween for entry of air from said air ports and below said sleeve valve member, said outer edges also serving to stiffen said lip portions to slightly delay opening of said slits upon water flow and insure that the side walls of said sleeve valve member close initially upon said air ports and prevent leakage therethrough.

4. In a vacuum breaker for a water supply system a tubular casing having air ports around the side thereof, a baffle member in said tubular casing having water ports therein, a flexible sleeve valve member in said tubular casing arranged between said tubular casing and said baffle member, means for clamping said baffle member and said flexible sleeve valve member together to the inlet end of said tubular casing, said flexible sleeve valve member operative responsive to water flow through said water ports to prevent leakage through said air ports, and operative responsive to a vacuum condition to prevent back syphonage through said water ports, said flexible sleeve valve member having a normally closed outlet end formed by three transversely arranged lip portions extending outward in three different directions from the common axis of said flexible sleeve valve member, and into contact with the inner walls of said tubular casing, each of said lip portions having a slit formed therein extending throughout the length thereof to a point adjacent the outer end of said lip portion, said lip portions adapted to open said slits responsive to water flow, whereby the side walls of said lip portions are expanded to conform substantially to the inner diameter of said tubular casing, said lip portions each having an outer edge extending outward from the outer wall of said sleeve valve member and into contact with the inner wall of said tubular casing to provide a space therebetween for entry of air from said air ports and below said sleeve valve member, said outer edges also serving to stiffen said lip portions to slightly delay opening of said slits upon water flow and insure that the side walls of said sleeve valve member close initially upon said air ports and prevent leakage therethrough.

5. In a vacuum breaker for a water supply system, a tubular casing having air ports around the sides thereof, a baffle member in said tubular casing having water ports therein, a flexible sleeve valve member in said tubular casing arranged between said tubular casing and said baffle member, means for clamping said baffle member and said flexible sleeve valve member together to the inlet end of said tubular casing, said flexible sleeve valve member operative responsive to water flow through said water ports to prevent leakage through said air ports, and operative responsive to a vacuum condition to prevent back syphonage through said water ports, said flexible sleeve valve member having a normally closed outlet end formed by three transverse relatively thick lip portions extending outwardly in three separate spaced directions from a common axis to the inner wall of said tubular casing, each of said lip portions having a slit formed therein extending outward from the common axis, said slits adapted to spread apart and expand, responsive to water flow, so that said lip portions engage the inner wall of said tubular casing, the total perimeter of all of said slits being substantially equal in length to the inner perimeter of said flexible sleeve valve member when said slits are fully opened by the water flow, said lip portions each having an outer edge extending outward from the outer wall of said sleeve valve member and into contact with the inner wall of said tubular casing to provide a space therebetween for entry of air from said air ports and below said sleeve valve member, said outer edges also serving to stiffen said lip portions to slightly delay opening of said slits upon water flow and insure that the side walls of said sleeve valve member close initially upon said air ports and prevent leakage therethrough.

6. In a vacuum breaker for a water supply system, a tubular casing having air ports around the sides thereof, a baffle member in said tubular casing having water ports therein, a flexible sleeve member in said tubular casing arranged between said casing and said baffle member, means for clamping said baffle member and said flexible sleeve member together to the inlet end of said tubular casing, said flexible sleeve member being operative in response to water flow through said water ports to expand and seal against said air ports, said flexible sleeve valve member further being responsive to a vacuum condition to collapse inwardly and seal against said water ports to prevent back siphonage, said flexible sleeve valve member having a normally closed outlet end below said baffle member, said outlet end having radially extending slits formed in thickened end lip portions, the flow of water through said water ports being effective to open said slits and permit a substantially free flow of water through said flexible sleeve valve member, said thickened end lip portions being of sufficient strength to remain closed under a vacuum condition, thereby preventing back siphonage upwardly past said slits.

References Cited
UNITED STATES PATENTS

| 15,192 | 6/1856 | Peale | 137—525.1 |
| 2,663,309 | 12/1953 | Filliung | 137—218 |
| 2,674,318 | 4/1954 | Sutliff | 137—525 X |
| 2,938,532 | 5/1960 | Fraser | 137—218 |

FOREIGN PATENTS 764,928  12/1954  Great Britain.

WILLIAM F. O'DEA, *Primary Examiner.*

D. H. LAMBERT, *Assistant Examiner.*